United States Patent
Nozaki

(10) Patent No.: US 6,357,182 B1
(45) Date of Patent: Mar. 19, 2002

(54) DOOR WEATHER STRIP ATTACHING STRUCTURE

(75) Inventor: Masahiro Nozaki, Tsushima (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/660,188

(22) Filed: Sep. 12, 2000

(30) Foreign Application Priority Data

Sep. 14, 1999 (JP) .............................................. 11-259850

(51) Int. Cl.$^7$ ................................................ E06B 7/22
(52) U.S. Cl. ...................................... 49/498.1; 49/489.1
(58) Field of Search ............................ 49/475.1, 484.1, 49/489.1, 492.1, 493.1, 498.1, 441

(56) References Cited

U.S. PATENT DOCUMENTS

| | | | |
|---|---|---|---|
| 4,381,115 A | * | 4/1983 | Ko .......................... 277/207 R |
| 4,872,288 A | | 10/1989 | Nozaki |
| 4,945,681 A | | 8/1990 | Nozaki et al. |
| 5,304,409 A | | 4/1994 | Nozaki |
| 5,389,409 A | | 2/1995 | Iwasa et al. |
| 5,715,632 A | | 2/1998 | Nozaki |
| 5,918,421 A | | 7/1999 | Nozaki |
| 6,131,342 A | * | 10/2000 | Miyamoto et al. ......... 49/484.1 |

* cited by examiner

*Primary Examiner*—Curtis A. Cohen
(74) *Attorney, Agent, or Firm*—Pillsbury Winthrop LLP

(57) ABSTRACT

A structure for attaching a door weather strip to a periphery of a doorframe. The doorframe has an inwardly facing protrusion in a projecting edge thereof. A door weather strip has a concave surface formed in its outside surface so as to face and be spaced apart from the protrusion. A channel-shaped groove is formed in a lower part of the concave surface, and a first seal lip is formed along an upper part of the concave surface to close an upper end of a space formed between the projecting edge and the concave surface. A second seal lip is formed along an outside part of the channel-shaped groove to close a lower end of the space, whereby leaked water is received within the channel-shaped groove.

4 Claims, 3 Drawing Sheets

DOOR WEATHER STRIP ATTACHING STRUCTURE

BACKGROUND OF THE INVENTION

1. Field of the Invention

The present invention relates to a structure for attaching a door weather strip to a periphery of a door frame of a motor vehicle.

2. Description of Related Art

In a motor vehicle having door frames, as illustrated in FIG. 1, a door weather strip is attached to a periphery of a door frame 10 for creating a seal between the door frame 10 and a door opening portion 12 of a vehicle body. Generally, upon attachment, the door weather strip is fitted to a retainer provided along the periphery of the door frame 10 or is secured to the periphery of the door frame 10 with clips.

FIG. 2 illustrates one example of the door weather strip (hereinafter referred to as "weather strip"). A weather strip W is attached to a periphery of a door frame 10, which faces the door opening portion 12 extending along a roof side 13 and center pillar 14 (FIG. 1). The door frame 10 is composed of an outer panel 10A and inner panel 10B. The inner panel 10B has a weather strip attaching surface 15 extending downwardly of a projecting edge 16 of the door frame. The weather strip W is an extruded body of sponge rubber and has a base portion 18 and a tubular seal portion 20. The weather strip W further includes a lip-shaped sub-seal portion 22. The base portion 18 is secured to the weather strip attaching surface 15 with clips 30 at predetermined intervals along the longitudinal direction thereof. The projecting edge 16 of the door frame 10 covers the outside surface of the weather strip W. When a door is closed, the tubular seal portion 20 contacts and presses the door opening portion 12, and the sub-seal portion 22 contacts and presses against an outer part 24 of the door opening portion 12 to effect a double seal between the door frame 10 and door opening portion 12.

On the other hand, to create a seal between the projecting edge 16 and weather strip W, a protrusion 26 is formed in the inner panel 10B so as to protrude inwardly from the projecting edge 16, and the outside surface 28 of the weather strip W is positioned in close proximity to the protrusion 26 so as to contact the protrusion 26.

However, some gaps may exist between the protrusion 26 and outside surface 28 of the weather strip W due to variations in the attached positions thereof relative to the door frame 10. If gaps exist, rain water and washing water, which have entered between a tip end of the projecting edge 16 and the outer part 24 of the door opening portion 12, may leak inwardly of the protrusion 26 via the gaps. Then, after passing under the base portion 18 of the weather strip W, the water leaked inwardly of the protrusion 26 may intrude into the vehicle compartment by way of the roof side portion of the door frame 12.

Especially, in the case where the weather strip W are attached with clips, the bottom surface of the base portion 18 of the weather strip W does not closely contact the weather strip attaching surface 15 between adjacent clips 30. Therefore, the water may intrude into the compartment of the motor vehicle. In addition, water leaked inwardly of the protrusion 26 may enter the inside of the door frame 10 by way of clip holes 32 formed in the weather strip attaching surface 15. Likewise, this leaking water may flow along an outer surface of a glass run (not shown), which is fitted in an opening of the door frame 10, to reach the inside surface of a door glass (not shown) after passing between the outer surface of the glass run and facing inner panel.

SUMMARY OF THE INVENTION

Accordingly, it is an object of the present invention to provide a structure for attaching a door weather strip, which prevents intrusion of water leaked between a door frame and the weather strip into a vehicle compartment.

With the weather strip attaching structure of the present invention, the door frame includes a protrusion, which protrudes inwardly from an inside surface of the projecting edge of the door frame. The door weather strip also has a base portion for attachment to the weather strip attaching surface of the door frame and a seal portion for contacting a door opening portion of a vehicle body. The structure in accordance with the present invention further includes a concave surface which is formed in an outside surface of the weather strip so as to face the protrusion of the door frame with a space, a channel-shaped groove having one of a U-shaped cross-section and V-shaped cross-section, which is formed in a lower part of the concave surface so as to open upwardly. A first seal lip is formed along an upper part of the concave surface such that a tip end thereof abuts the inside surface of the projecting edge, and a second seal lip is formed along an outside part of the channel-shaped groove so as to stand upright on the base portion. A tip end of the second seal lip abuts an under surface of the protrusion.

If water leaks between the projecting edge of the door frame and the first seal lip of the weather strip, the water is received within the channel-shaped groove formed in the lower part of the concave surface of the weather strip. Then, the water flows along the channel-shaped groove of the weather strip attached to the door frame and is discharged outside the vehicle's body from the front and rear lower ends of the weather strip.

Other objects, features, and characteristics of the present invention will become apparent upon consideration of the following description and the appended claims with reference to the accompanying drawings, all of which forms a part of this specification.

DETAILED DESCRIPTION OF THE PREFERRED EMBODIMENTS

Figure 1:
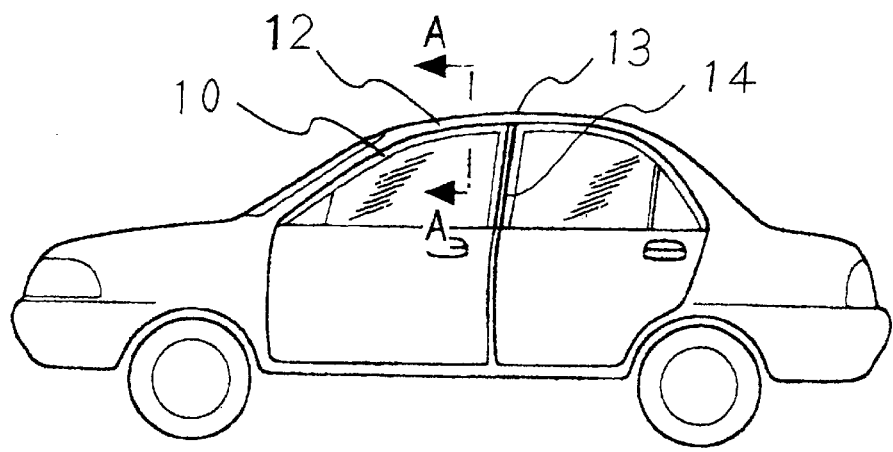
FIG. 1 is a side view of a motor vehicle to which a door weather strip is attached.
Figure 2:
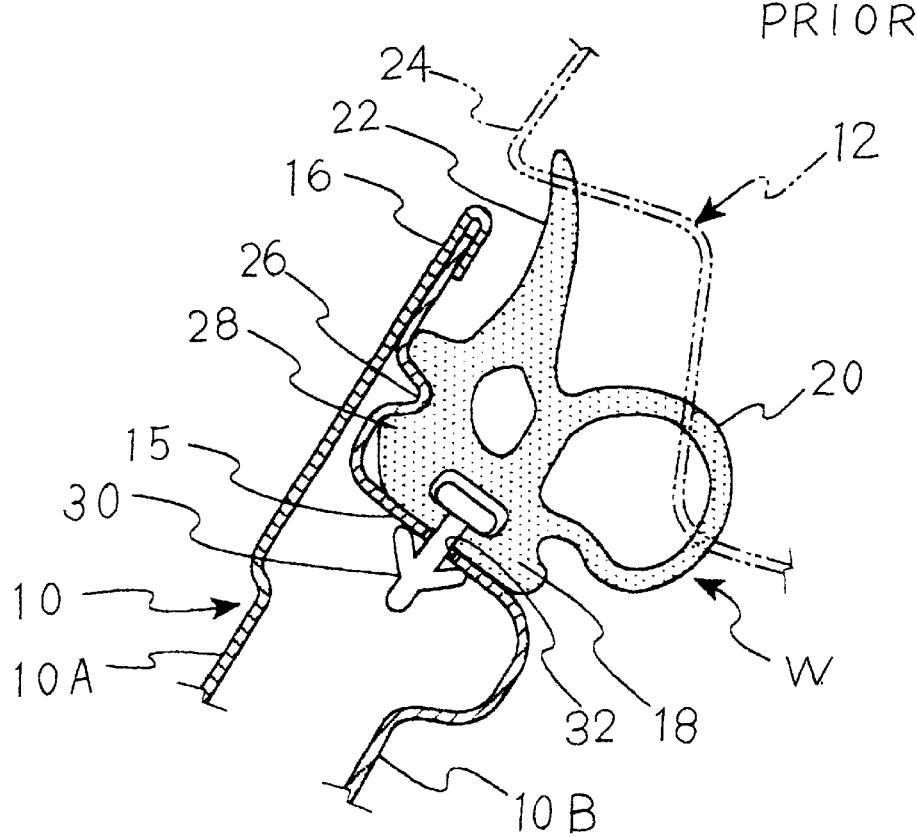
FIG. 2 is a cross-sectional view of a conventional structure for attaching a door weather strip to the motor vehicle, taken along the line A—A of FIG. 1.
Figure 3:
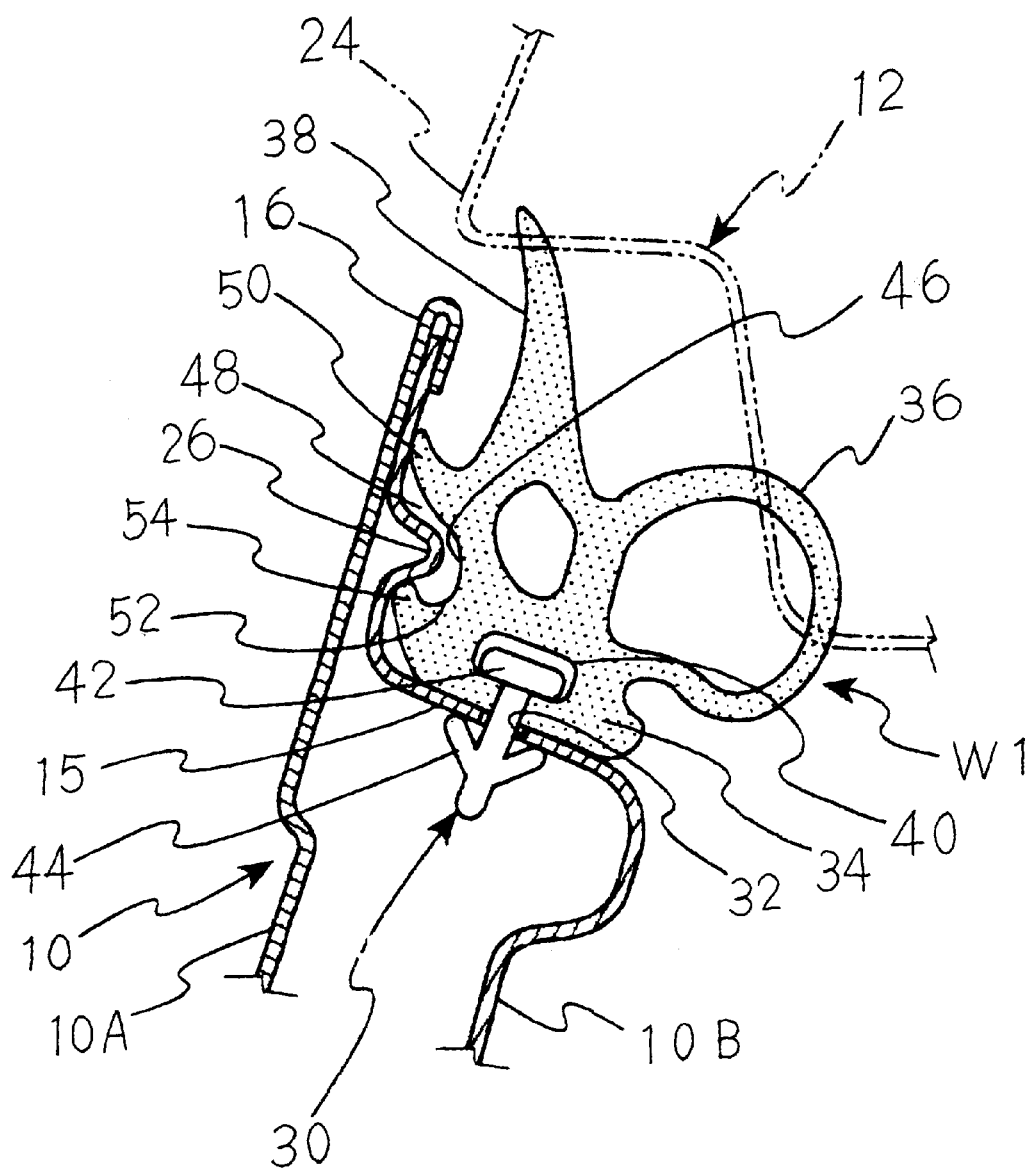
FIG. 3 is a cross-sectional view of one embodiment of a door weather strip attaching structure in accordance with the present invention, taken along the line A—A of FIG. 1.

As illustrated in FIG. 3, a door frame 10 is composed of an outer panel 10A and inner panel 10B. The outer panel 10A extends upwardly to define a projecting edge 16. The inner panel 10B has a protrusion 26 having a generally triangular cross-section, which protrudes inwardly away from the middle of the projecting edge 16. The inner panel 10B expands inwardly below the protrusion 26 to define a weather strip attaching surface 15. Then, the inner panel 10B extends downwardly in a generally parallel relationship with the outer panel 10A. A glass run (not shown) is provided within the door frame 10 under the weather strip attaching surface 15.

A weather strip W1 is composed of an integrally extruded body of sponge rubber. The weather strip W1 consists of a base portion 34, tubular seal portion 36 and sub-seal portion 38. In the base portion 34, a hollow space 40 is continuously formed in the longitudinal direction thereof. Clips 30 are mounted on the base portion 34 so as to penetrate the weather strip W1 at predetermined intervals with heads 42 placed within the hollow space 40 of the base portion 34. The weather strip W1 is secured to the weather strip attaching surface 15 by press-fitting locking parts 44 of the clips 30 into clip holes 32 formed in the weather strip attaching surface 15.

In the attached state, the weather strip W1 is almost completely covered with the projecting edge 16 of the door frame 10. The seal portion 36 expands inwardly from the base portion 34, and the sub-seal portion 38 stands upright on the base portion 34. When a door is closed upon the weather strip W1, the seal portion 36 contacts and presses against a door opening portion 12 of the vehicle body, and a tip end of the sub-seal portion 38 contacts and presses against an outer part 24 of the door opening portion 12.

A concave surface 46 is continuously formed in the outside surface of the weather strip W1 in a longitudinal direction thereof so as to face the protrusion 26 of the door frame 10. An opening, space 48, is formed between the concave surface 46 and the protrusion 26. A first seal lip 50 is formed along an upper part of the concave surface 46. The first seal lip 50 extends obliquely upwardly, and a tip end thereof abuts the inner panel lOB of the door frame 10 above the protrusion 26 to seal the upper end of the space 48. The concave surface 46 extends downwardly along the protrusion 26 to the under side thereof. The lower part of the concave surface 46 defines a channel-like groove 52 having a generally U-shaped cross-section, which opens upwardly.

An outside edge of the base portion 34, which faces the inner panel 10B of the projecting edge 16 of the door frame 10, stands upright to form a second seal lip 54. A tip end of the second seal lip 54 abuts the under surface of the protrusion 26 to seal a lower end of the space 48.

With the weather strip attaching structure thus arranged, rain water and washing water, which have entered between the upper end of the projecting edge 16 and sub-seal portion 38 of conventional weather strips, are prevented by the first seal lip 50 from leaking into a vehicle.

However, the sealing force of the first lip 50 at some localities along the weather strip W1 may become weakened due to the variations in the attached position of the weather strip W1 relative to the door frame 10 to cause water leakage. In such a case, the present invention is designed so that a portion of the leaking water may flow downwardly along the protrusion 26 of the inner panel 10B while the remaining water may flow downwardly along the concave surface 46 of the weather strip W1. The portion of water flowing along the protrusion 26 may drop downwardly from a protrusion end thereof into the channel-like groove 52. The remaining portion of water may reach the under surface of the protrusion 26 and flow downwardly into the channel-like groove 52 along the side surface of the second seal lip 54 which stands upright to abut the under surface of the protrusion 26 at a tip end thereof. On the other hand, the water flowing downwardly along the concave surface 46 of the weather strip W1 also reaches the channel-like groove 52. Thus, all of the water leakage is received within the channel-like groove 52 and flows therealong in the inclining direction of the door frame 10. Then, the water flows downwardly along a vertical part of the weather strip and is discharged outside the vehicle body. Consequently, water is prevented from intruding between the base portion 34 of the weather strip W1 and facing weather strip attaching surface 15 of the door frame 10.

Figure 4:
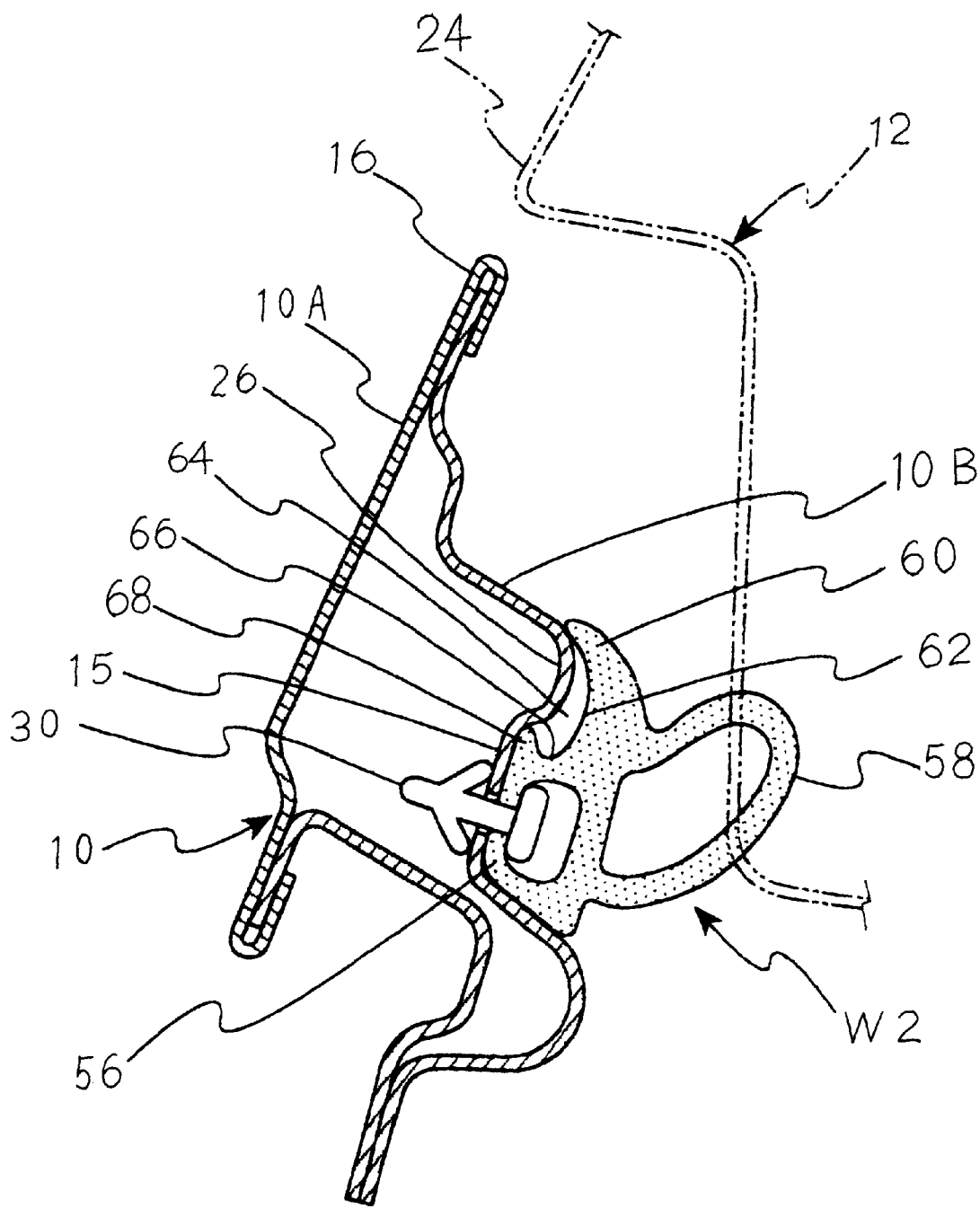
FIG. 4 is a cross-sectional view of another embodiment of a door weather strip attaching structure in accordance with the present invention, taken along the line A—A of FIG. 1.

FIG. 4 illustrates another embodiment of the present invention. As shown, the weather strip attaching surface 15 of the inner panel 10B and the door frame 10 is formed vertically in a generally parallel relationship with the projecting edge 16 of the door frame 10. A protrusion 26 is formed in the inner panel 10B above the weather strip attaching surface 15 so as to protrude inwardly. A base portion 56 of a weather strip W2 is secured to the weather strip attaching surface 15 with clips 30. A tubular seal portion 58 expands inwardly and presses against a door opening portion 12 of a vehicle body when a door is closed on the weather strip W2. The weather strip W2 is not provided with a component that corresponds to the sub-seal portion 38 in the preceding embodiment.

A first seal lip 60 projects from the upper surface of the weather strip W2. A tip end of the first seal lip 60 abuts an upper surface of the protrusion 26. An outside surface of the first seal lip 60 partly defines a concave surface 62 which faces the protrusion 26. An opening, space 64, is formed between the concave surface 62 and the protrusion 26. An upper edge of the base portion 56 projects upwardly along the weather strip attaching surface 14 to define a second seal lip 68 of which a tip end abuts an under surface of the protrusion 26. Thus, the lower part of the concave surface 62 and second seal lip 68 define a channel-like groove 66 having a generally V-shaped cross section.

The remainder of the attaching structure of the present embodiment is substantially identical to that of the preceding embodiment, and parts similar to those in FIG. 3 are given the same reference numerals as in FIG. 3.

With the present embodiment, all of the water leaked between the inner panel 10B and tip end of the first seal lip 60 is received with the channel-like groove 66 formed along the lower part of the concave surface 62, similarly to the preceding embodiment. Consequently, water is prevented from intruding between the base portion 56 of the weather strip W2 and facing weather strip attaching surface 14 of the door frame 10.

The weather strip in accordance with the present invention is also applicable to a weather strip of which the base portion is attached with double-sided adhesive tapes.

As described above, with the weather strip attaching structure in accordance with the present invention, in the case of double-sided adhesive tapes, a channel-like groove for receiving water leaked along the first seal lip is provided in the weather strip under the first seal lip. Consequently, water is prevented from intruding into the vehicle compartment via the weather strip attaching surface of the door frame.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. An attaching structure of a door weather strip to a periphery of a door frame of a motor vehicle, the door frame comprising:

an outer panel and an inner panel which define a projecting edge projecting upwardly from a weather strip attaching surface formed in said inner panel; and a protrusion formed in said inner panel so as to protrude inwardly from said projecting edge, wherein the door weather strip comprises:
- a base portion which is secured to said weather strip attaching surface of said inner panel of the door frame with clips at predetermined intervals;
- a seal portion for contacting a door opening portion of a vehicle body;
- a concave surface formed in an outside surface of said door weather strip so as to face said protrusion of said inner panel of the door frame said concave surface having a channel-shaped groove in a lower part thereof, forming a space between said protrusion and said concave surface said channel-shaped groove opening upwardly and having one of U-shaped cross-section and V-shaped cross-section;
- a first seal lip formed along an upper part of said concave surface such that a tip end thereof abuts said inner panel defining said projecting edge above said protrusion; and
- a second seal lip formed along an outside part of said channel-shaped groove so as to stand upright on said base portion, a tip end of said second seal lip abutting an under surface of said protrusion.

2. An attaching structure as claimed claim 1, wherein:

said inner panel defining said projecting edge protrudes inwardly into a triangular cross-section, thereby defining said protrusion;

said concave surface of said door weather strip has such a configuration as to extend along and spaced from said protrusion;

said outside part of said channel-shaped groove stands upright along said inner panel defining said projecting edge; and a tip end of said second seal lip abuts an under surface of said protrusion.

3. A structure as claimed in claim 1, wherein said base portion is secured to said weather strip attaching surface of said door frame with clips at predetermined intervals.

4. An attaching structure of a door weather strip to a periphery of a door frame of a motor vehicle, the door frame comprising:

an outer panel and an inner panel which define a projecting edge projecting upwardly along the outer periphery of the door frame; and a protrusion formed in said inner panel so as to protrude inwardly below said projecting edge, wherein the door weather strip comprises:
- a base portion which is secured to a weather strip attaching surface formed in said inner panel of the door frame below said protrusion with clips at predetermined intervals;
- a seal portion for contacting a door opening portion of a vehicle body;
- a concave surface formed in an outside surface of said door weather strip so as to face said protrusion of said inner panel of the door frame, said concave surface having a channel-shaped groove in a lower part thereof, forming a space between said protrusion and said concave surface said channel-shaped groove opening upwardly and having one of U-shaped cross-section and V-shaped cross-section;
- a first seal lip formed along an upper part of said concave surface such that a tip end thereof abuts an upper surface of said protrusion;
- a second seal lip formed along an outside part of said channel-shaped groove so as to stand upright on said base portion, a tip end of said second seal lip abutting an under surface of said protrusion.

* * * * *